Aug. 5, 1969  H. H. RICHTER  3,458,985
FALSE TWIST SPINDLE ASSEMBLY
Filed Nov. 9, 1967
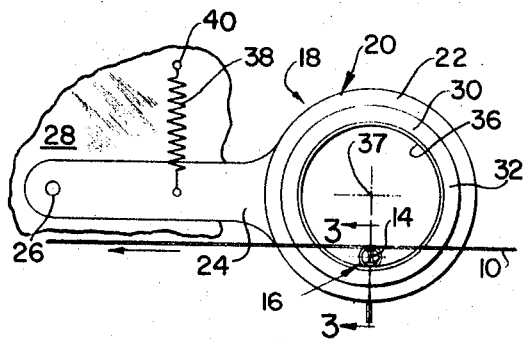
FIG. 1
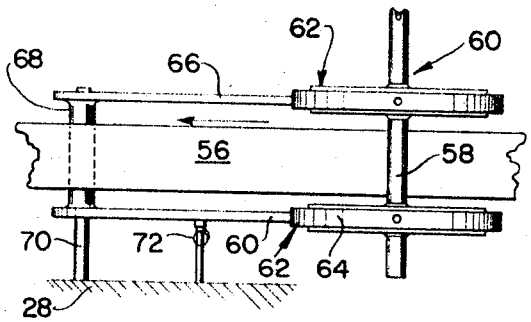
FIG. 4
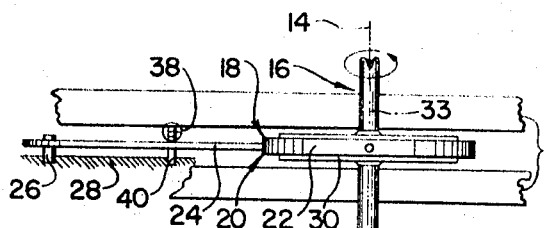
FIG. 2
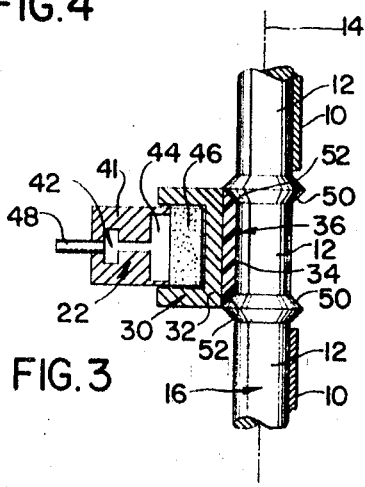
FIG. 3
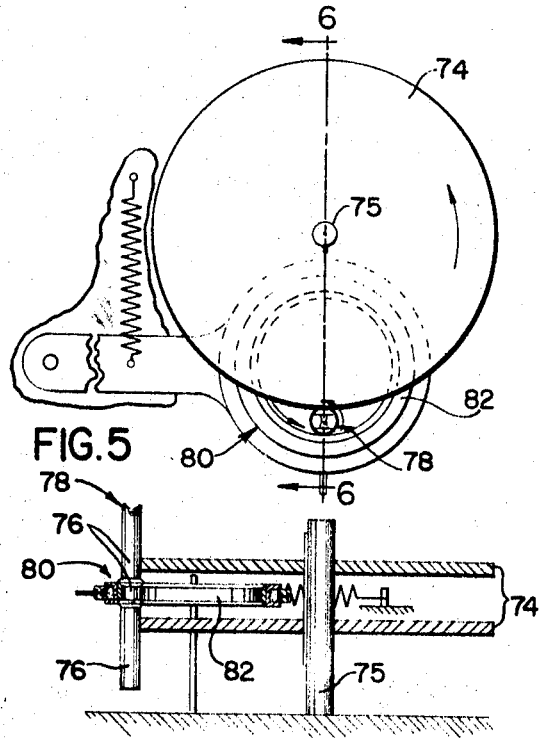
FIG. 5
FIG. 6
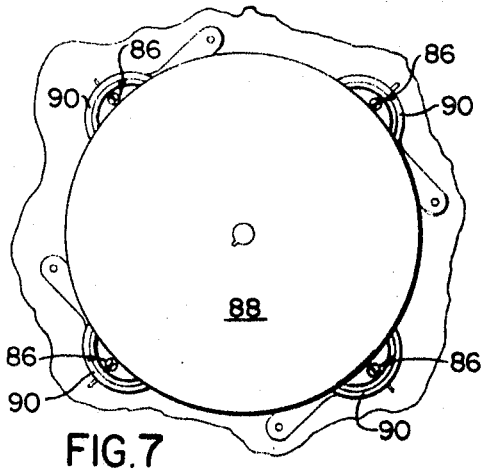
FIG. 7
INVENTOR.
HANS H. RICHTER
BY Albert P. Davis
Bennett W. Norton
ATTORNEYS United States Patent Office 3,458,985
Patented Aug. 5, 1969

3,458,985
FALSE TWIST SPINDLE ASSEMBLY
Hans H. Richter, Cranston, R.I., assignor to Leesona Corporation, Warwick, R.I., a corporation of Massachusetts
Filed Nov. 9, 1967, Ser. No. 681,764
Int. Cl. D01h 7/92, 7/46, 13/00
U.S. Cl. 57—77.45                                 9 Claims

ABSTRACT OF THE DISCLOSURE

A high speed spindle apparatus in which the spindle is held in engagement with a driving unit by the inner race of an air bearing unit which encircles the spindle.

---

This invention relates to textile apparatus and, more particularly, to a false twist spindle assembly.

Various expedients are known for mounting and driving spindles. Spindles driven at high speed present problems not encountered with spindles operating at lower speeds. One of these problems is overcoming drag encountered at higher speed. Another problem is preventing spindle wobble. These problems are particularly apparent in false twist spindles used in the textile industry. Such spindles may operate well above one million r.p.m.

It has become common practice to retain false twist spindles in engagement with a driving member by some sort of magnetic means. At high speeds, electric current generated by the magnetic means is undesirable for obvious reasons including generation of heat and resultant drag on the spindle. Furthermore, as the spindle speed is increased the strength of the magnetic field must be increased, thus increasing the adverse effects and providing a practical limit to spindle speed. Related expedients include retaining the spindle against a driving disc by means of one or more retaining discs running against the spindle, but this wastes power in driving the retaining disc and has other limitations. Another problem is preventing undesirable wobble in commercially practical high speed spindles.

The invention, in brief, is directed to a high speed spindle suitably driven by a belt or rotating disc driving unit, with the spindle operatively positioned in engagement with the driving unit and effectively prevented from wobbling by means of a very low friction rotary bearing (such as an air bearing) having an inner race of substantially greater curvature than the spindle and in running engagement with and encircling the spindle generally diametrically opposite the point of engagement of the driving unit.

It is a primary object of this invention to provide a new and improved spindle assembly.

Another object of this invention is to provide a new and improved high speed spindle assembly. A related object is provision of such an assembly in which substantially increased spindle speed is practical. Another related object is provision in such an assembly for effectively preventing undesirable wobble in the spindle.

A more specific object is provision of a new and improved high speed spindle assembly in which a spindle is driven in a suitable manner by engagement with a driving unit and is retained operatively positioned and held against undesirable wobbling by running engagement with the inner race of at least one rotary bearing. A related object is provision in such an assembly of the rotary bearing in the form of an air bearing.

These and other objects and advantages of the invention will be apparent from the following description and the accompanying drawings, in which:

FIG. 1 is a fragmentary, schematic plan view of an embodiment of the invention;

FIG. 2 is a fragmentary, schematic elevational view of the embodiment illustrated in FIG. 1;

FIG. 3 is a fragmentary, enlarged sectional view taken generally along the line 3—3 in FIG. 1;

FIG. 4 is a fragmentary, schematic elevational view of another embodiment of the invention;

FIG. 5 is a fragmentary, schematic plan view of still another embodiment of the invention;

FIG. 6 is a sectional view taken generally along the line 6—6 in FIG. 5; and

FIG. 7 is a fragmentary schematic plan view of still another embodiment of the invention.

Referring to FIGS. 1 and 2 of the drawings, a portion of a false twist machine is shown including a driving unit in the form of a pair of parallel spaced apart driven belts 10. These driven belts are in running engagement with a cylindrical engaging portion 12 coaxial with the rotational axis 14 of a false twist spindle 16, for rotating the spindle.

A positioning unit 18 includes a rotary bearing 20 having an outer race 22 fixedly secured to an arm 24 suitably pivotally mounted as by a pin 26 on a base 28 of the false twist machine. An inner race 30 of the bearing 20 has a rigid body 32 with a cylindrical inner face 34 on a liner 36 (FIG. 3) of nylon or other suitable slightly resilient material firmly secured to the body of the inner race. The inner race is in running engagement with the spindle engaging portion 12 and rotatable about a central axis 37 parallel to the spindle axis 14. The inner face 34 engages the cylindrical engaging portion 12 of the spindle 16 between the two driving belts 10 and is resiliently urged against the spindle by a tension spring 38 having one end secured to the mounting arm 24 and opposite end secured to a pin 40 suitably secured to the base 28.

The rotary bearing 20 is preferably of the air suspension type, and as shown in FIG. 3 includes a body 41 of the outer race 22 having a suitable passage system 42 terminating in an inwardly opening channel 44 facing a porous or foaminous annular member 46, such as sintered metal, fixedly secured to the body 41 of the outer race. The inner race 30 is generally channel shaped in cross section and embraces the porous member 46 and a portion of a body 41 of the outer race 22. A suitable fluid, such as air, is injected at about 80 p.s.i. through a connector 48 into the passage system 42, from which it passes through the porous member 46 and between the porous member and the inner race 30, to support the inner race as this race is rotated in running engagement with the engaging portion 12 of the false twist spindle 16. Beveled annular shoulders 50 are in running engagement with complementary beveled annular surfaces 52 on the liner 36 to restrain the spindle 16 against axial movement and to provide for easy replacement of the spindle.

The area of engagement of the belts 10 with the spindle engaging portion 12 and the area of engagement of the inner race 30 of the bearing 20 are effectively diametrically opposed to each other with reference to the spindle, and the area of engagement of the inner race and the spindle preferably lie along radius common to the spindle and the inner race.

Another embodiment of the invention is illustrated in FIG. 4 wherein a single driving belt 56 engages a cylindrical engaging portion 58 of a false twist spindle 60 between a pair of bearings 62 (each as previously described) which engage the cylindrical engaging portion 58 of the spindle opposite the belt, generally as previously described. Each bearing has its outer race 64 fixedly secured to an arm 66, generally as previously described, with the arms 66 fixedly secured to each other, as by a sleeve 68, for movement together about a common pivot such as a pin 70 secured to the base 28 of the false twist machine, and urged against the spindle by a tension spring 72.

Another embodiment is illustrated in FIGS. 5 and 6 in which a pair of spaced apart driving discs 74 rotated by a common drive shaft 75 engage a cylindrical engaging portion 76 of a false twist spindle 78 and a positioning bearing 80 is mounted (as previously described) with its inner race 82 engaging a portion of the engaging portion 76 of the spindle diametrically opposite the engagement area of the discs 74. The driving discs 74 may be driven in any suitable manner as by a drive belt (not shown). In this embodiment, the axes of the driving discs, the false twist spindle, and the inner race of the positioning bearing preferably lie along a common radius and are parallel to each other.

A composite embodiment is shown in FIG. 7 wherein four false twist spindles 86 are driven by common drive discs 88 of the type shown in FIGS. 5 and 6. Each spindle has a separate positiong bearing 90 mounted generally as shown in FIG. 5. The embodiments shown in FIGS. 5–7 may be driven by a single driving disc, with a pair of positioning bearings on opposite sides of the disc, one such pair of bearings for each false twist spindle, generally as shown in the embodiment in FIG. 4.

By provision of a bearing having an inner race of substantially greater diameter than the diameter of the engaged portion of the spindle, the bearing operates at relatively low speed. This, coupled with provision of a very low friction bearing, such as an air bearing, results in very little drag on the spindle. Since the inner race of the bearing is cupped about the spindle and is held in resilient engagement with the spindle, wobble of the spindle is effectively prevented.

While this invention has been described and illustrated with reference to particular embodiments in a particular environment, various changes may be apparent to one skilled in the art.

What is claimed is:

1. A spindle assembly comprising a spindle rotatable about an axis and having an engaging portion encircling said axis, positioning means for holding said spindle operatively positioned and including a member having a concavely circular face of substantially greater curvature than the effective curvature of said engaging portion, driving means for driving the spindle, and means mounting said driving means and said face in effectively diametrically opposed running engagement with said engaging portion during normal operation of the assembly.

2. An assembly as set forth in claim 1 in which said positioning means comprises a bearing having inner and outer races and said face is on said inner race.

3. An assembly as set forth in claim 2 in which said bearing is an air bearing, and said inner race rotates relatively to said outer race on a cushion of air during normal operation of the assembly.

4. An assembly as set forth in claim 1 in which said engaging portion is concentric with said axis, and said face has a central axis substantially parallel to the spindle axis.

5. An assembly as set forth in claim 1 in which said engaging portion is concentric with the spindle axis, and said positioning means comprises an air bearing having inner and outer races, said inner race rotates relatively to said outer race on a cushion of air during normal operation of the assembly, and said face is on said inner race and has a central axis substantially parallel to the spindle axis.

6. Apparatus as set forth in claim 5 in which said driving means includes a pair of driving elements engaging said engaging portion and spaced apart axially of the spindle, and said positioning means includes a positioning element engaging said engaging portion axially intermediate said driving elements.

7. Apparatus as set forth in claim 5 in which said positioning means includes a pair of positioning elements engaging said engaging portion and spaced apart axially of the spindle, and said driving means includes a driving element engaging said engaging portion axially intermediate said positioning elements.

8. Apparatus as set forth in claim 5 in which said driving means includes at least one belt drivingly engaging said engaging portion.

9. Apparatus as set forth in claim 5 in which said driving means includes at least one disc drivingly engaging said engaging portion.

References Cited

UNITED STATES PATENTS

| | | | |
|---|---|---|---|
| 687,428 | 11/1901 | Heinze | 57—77.45 |
| 2,227,910 | 1/1941 | Pool | 57—77.4 XR |
| 3,074,225 | 1/1963 | Scragg | 57—77.45 |
| 3,267,657 | 8/1966 | Kunzle et al. | 57—77.45 |
| 3,292,357 | 12/1966 | Richter | 57—77.45 |

JOHN PETRAKES, Primary Examiner

U.S. Cl. X.R.

57—103